(12) United States Patent
Miyamoto et al.

(10) Patent No.: US 11,227,635 B2
(45) Date of Patent: Jan. 18, 2022

(54) RECORDING DEVICE, READOUT DEVICE, RECORDING METHOD, RECORDING PROGRAM, READOUT METHOD, READOUT PROGRAM, AND MAGNETIC TAPE

(71) Applicant: FUJIFILM CORPORATION, Tokyo (JP)

(72) Inventors: Kentaro Miyamoto, Tokyo (JP); Takashi Miyamoto, Tokyo (JP); Michitaka Kondo, Tokyo (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 17/022,110

(22) Filed: Sep. 16, 2020

(65) Prior Publication Data

US 2021/0005221 A1 Jan. 7, 2021

Related U.S. Application Data

(63) Continuation of application No. PCT/JP2019/011474, filed on Mar. 19, 2019.

(30) Foreign Application Priority Data

Mar. 22, 2018 (JP) .............................. JP2018-054858
Feb. 26, 2019 (JP) .............................. JP2019-032548

(51) Int. Cl.
*G11B 5/09* (2006.01)
*G11B 20/10* (2006.01)
*G11B 5/008* (2006.01)

(52) U.S. Cl.
CPC .......... *G11B 20/10* (2013.01); *G11B 5/00813* (2013.01); *G11B 2020/10898* (2013.01)

(58) Field of Classification Search
None
See application file for complete search history.

(56) References Cited

U.S. PATENT DOCUMENTS 10,204,657 B2 * 2/2019 Yanagita ................. H04N 5/222
10,607,653 B2 * 3/2020 Hayashi ................. G11B 20/10
(Continued)

FOREIGN PATENT DOCUMENTS

JP 2015-041389 A 3/2015
JP 2016-004413 A 1/2016
(Continued)

OTHER PUBLICATIONS

International Search Report issued in International Application No. PCT/JP2019/011474 dated Jun. 25, 2019.
(Continued)

*Primary Examiner* — Peter Vincent Agustin
(74) *Attorney, Agent, or Firm* — Solaris Intellectual Property Group, PLLC

(57) ABSTRACT

A recording device includes: a recording unit that records plural objects including data and metadata related to the data on a portable recording medium, and executes a process of recording first set data, which is a set of the metadata included in the object, at every predetermined timing after recording at least one of the objects, wherein each piece of the first set data is a set of the metadata included in the object recorded after recording of immediately preceding recorded first set data.

11 Claims, 16 Drawing Sheets

(56) References Cited

U.S. PATENT DOCUMENTS

| | | | | |
|---|---|---|---|---|
| 2007/0286046 A1* | 12/2007 | Nagar | ............... | G06F 3/0677 |
| | | | | 369/53.24 |
| 2007/0291391 A1* | 12/2007 | Gill | ............... | G11B 5/00813 |
| | | | | 360/55 |
| 2013/0265669 A1* | 10/2013 | Hostetter | ......... | G11B 5/00821 |
| | | | | 360/60 |
| 2015/0002958 A1* | 1/2015 | Altknecht | ......... | G11B 15/6651 |
| | | | | 360/74.1 |
| 2015/0055241 A1 | 2/2015 | Abe et al. | | |
| 2016/0012073 A1* | 1/2016 | Ashida | ............. | G11B 27/328 |
| | | | | 707/741 |
| 2016/0077757 A1* | 3/2016 | Hasegawa | ........... | G06F 3/0622 |
| | | | | 711/111 |
| 2016/0147479 A1 | 5/2016 | Iwanaga et al. | | |
| 2018/0018238 A1 | 1/2018 | Tomii et al. | | |
| 2021/0005221 A1* | 1/2021 | Miyamoto | ........... | G11B 20/10 |

FOREIGN PATENT DOCUMENTS

| | | | |
|---|---|---|---|
| JP | 2016-053895 A | 4/2016 | |
| JP | 2016-099949 A | 5/2016 | |
| JP | 2018-10398 A | 1/2018 | |

OTHER PUBLICATIONS

Written Opinion of the ISA issued in International Application No. PCT/JP2019/011474 dated Jun. 25, 2019.
Extended European Search Report dated Dec. 11, 2020, issued in corresponding EP Patent Application No. 19772601.1.
English language translation of the following: Office action dated Nov. 30, 2021 from the JPO in a Japanese patent application No. 2020-507839 corresponding to the instant patent application.

\* cited by examiner

RECORDING DEVICE, READOUT DEVICE, RECORDING METHOD, RECORDING PROGRAM, READOUT METHOD, READOUT PROGRAM, AND MAGNETIC TAPE

CROSS-REFERENCE TO RELATED APPLICATIONS

This application is a continuation application of International Application No. PCT/JP2019/011474, filed on Mar. 19, 2019, which is incorporated herein by reference in its entirety. Further, this application claims priority from Japanese Patent Application No. 2018-054858, filed on Mar. 22, 2018, and No. 2019-032548, filed on Feb. 26, 2019, the disclosure of which are incorporated by reference herein in their entirety.

BACKGROUND

Technical Field

The present invention relates to a recording device, a readout device, a recording method, a recording program storage medium, a readout method, a readout program storage medium, and a magnetic tape.

Related Art

Conventionally, a linear tape file system (LTFS) is known as a file system using a portable recording medium such as a magnetic tape.

As a technique related to this file system, JP2016-004413A discloses a technique of continuously writing a plurality of files on a tape so as to form one combined file. In this technique, after a first index including a start position and a size of the combined file on the tape is written on the tape, a second index including a start position and a size for each of a plurality of files in the combined file on the tape is written on the tape.

By the way, as shown in FIG. 17, in the above-described LTFS, a recording region of the magnetic tape is divided into an index partition and a data partition. Data to be stored by the user, such as document data and image data, is recorded from a beginning of the data partition of the magnetic tape. Then, for example, in a case where a total size of the recorded data exceeds a predetermined size, an index (index 1 in FIG. 17) including information indicating positions of each recorded data on the magnetic tape is recorded in the data partition.

In addition, in a case where the data is recorded exceeding a predetermined size after the index is recorded, a new index (index 2 in FIG. 17) is recorded. This index includes information indicating the positions on the magnetic tape of all the data recorded from the beginning of the magnetic tape.

Therefore, there is a problem in that the larger the number of data recorded on the magnetic tape, the larger the size of the index and the lower an effective capacity of the magnetic tape. Here, the effective capacity means a capacity of the magnetic tape in which the data to be stored by the user can be recorded.

In the technique disclosed in JP2016-004413A, a data transfer rate in a case of recording a large number of small-sized data on a magnetic tape is taken into consideration, but a decrease of the effective capacity of the magnetic tape due to increase in the size of the index as described above is not taken into consideration. The above-mentioned problem is not limited to the magnetic tape, and can occur even in another portable recording medium to which a method of enlarging the index is applied by including information representing recording positions of all the data recorded up to the time at which the index is recorded in the index.

SUMMARY

The present disclosure has been made in view of the above circumstances, and provides a recording device, a readout device, a recording method, a recording program storage medium, a readout method, a readout program storage medium, and a magnetic tape that can suppress a decrease of an effective capacity of a portable recording medium.

An aspect of the present disclosure is a recording device that comprises a recording unit that records a plurality of objects including data and metadata related to the data on a portable recording medium, and executes a process of recording first set data, which is a set of metadata included in the object, at every predetermined timing after recording at least one of the objects, in which each piece of the first set data is a set of the metadata included in the object recorded after recording of immediately preceding recorded first set data.

In the recording device according to the aspect, the recording unit may record second set data, which is a set of the recorded first set data, on the portable recording medium after recording at least one of the first set data.

Further, in the recording device according to the aspect, the recording unit may overwrite and record the object on the second set data in a case where a size of the second set data recorded on the portable recording medium is equal to or less than a predetermined size and the object is recorded on the portable recording medium.

Further, in the recording device according to the aspect, the portable recording medium may include a reference partition and a data partition in which the object is recorded, and the recording unit may record the first set data and the second set data in the data partition, and in a case where a size of the second set data recorded in the data partition exceeds a predetermined size, records the second set data recorded in the data partition in the reference partition.

Further, in the recording device according to the aspect, in a case where the second set data recorded in the data partition is recorded in the reference partition, the recording unit may record the second set data recorded in the data partition in the reference partition without deleting the second set data.

Further, in the recording device according to the aspect, the metadata may include system-specific identification information and object-specific identification information including the metadata.

Further, in the recording device according to the aspect, the portable recording medium may be a magnetic tape.

Another aspect of the present disclosure is a readout device that comprises a specifying unit that specifies a position on a portable recording medium of an object recorded in a data partition of the portable recording medium including a reference partition and the data partition in which an object including data and metadata related to the data is recorded, by using at least one of second set data recorded in the reference partition, the second set data recorded in the data partition, first set data recorded in the data partition, or the metadata recorded in the data partition;

and a readout unit that reads the object recorded at the position specified by the specifying unit.

In the readout device according to the aspect, the specifying unit may specify the position by referring to the second set data recorded in the reference partition, the second set data recorded in the data partition, the first set data recorded in the data partition, and the metadata recorded in the data partition in this order.

Another aspect of the present disclosure is a recording method executed by a computer, the method including recording a plurality of objects including data and metadata related to the data on a portable recording medium; and executing a process of recording first set data, which is a set of the metadata included in the object, at every predetermined timing after recording at least one of the objects, each piece of the first set data being a set of the metadata included in the object recorded after recording of immediately preceding recorded first set data.

Another aspect of the present disclosure is a non-transitory storage medium storing a program for causing a computer to execute a recording processing, the recording processing comprising: recording a plurality of objects including data and metadata related to the data on a portable recording medium; and executing a process of recording first set data, which is a set of the metadata included in the object, at every predetermined timing after recording at least one of the objects, wherein each piece of the first set data is a set of the metadata included in the object recorded after recording of immediately preceding recorded first set data.

Another aspect of the present disclosure is a readout method executed by a computer, the method including specifying a position on a portable recording medium of an object recorded in a data partition of the portable recording medium including a reference partition and the data partition in which the object including data and metadata related to the data is recorded, by using at least one of second set data recorded in the reference partition, the second set data recorded in the data partition, first set data recorded in the data partition, or the metadata recorded in the data partition; and reading the object recorded at the specified position.

Another aspect of the present disclosure is a non-transitory storage medium storing a program for causing a computer to execute a readout processing, the readout processing comprising: specifying a position on a portable recording medium of an object recorded in a data partition of the portable recording medium including a reference partition and the data partition in which the object including data and metadata related to the data is recorded by using at least one of second set data recorded in the reference partition, the second set data recorded in the data partition, first set data recorded in the data partition, or the metadata recorded in the data partition; and reading the object recorded at the specified position.

Another aspect of the present disclosure is a magnetic tape on which a plurality of objects including data and metadata related to the data are recorded, and a process of recording first set data, which is a set of the metadata included in the object, is executed at every predetermined timing after at least one of the objects is recorded, in which each piece of the first set data is a set of the metadata included in the object recorded after recording of immediately preceding recorded first set data.

According to the present disclosure, it is possible to suppress a decrease of an effective capacity of the portable recording medium.

DETAILED DESCRIPTION

Hereinafter, an example of an aspect for carrying out the technology of the present disclosure will be described in detail with reference to the drawings.

First Embodiment

Figure 1:
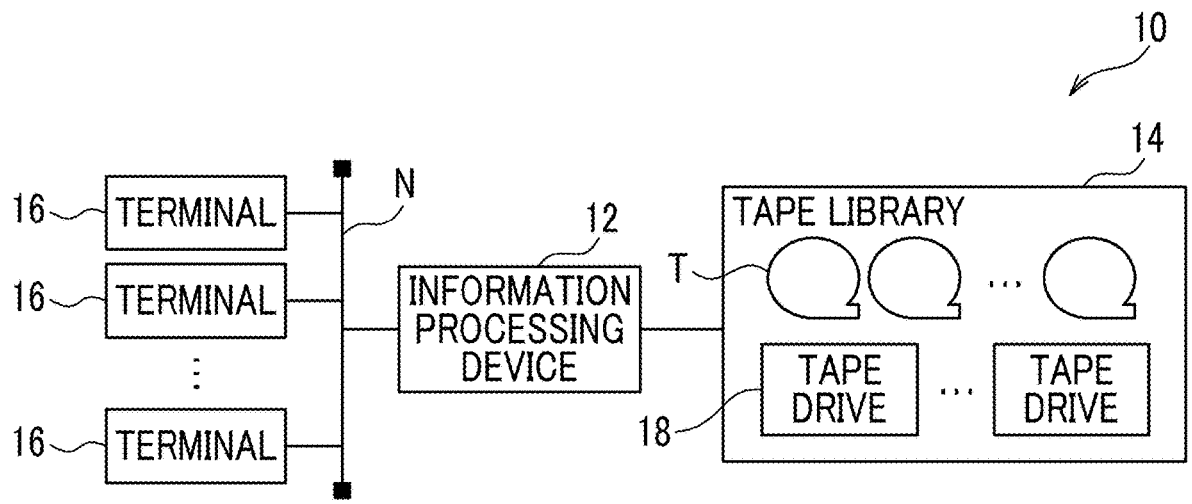
FIG. 1 is a block diagram showing an example of a configuration of a recording/readout system according to each embodiment.

First, a configuration of a recording/readout system 10 according to the present embodiment will be described with reference to FIG. 1. As shown in FIG. 1, the recording/readout system 10 includes an information processing device 12 and a tape library 14. The tape library 14 is connected to the information processing device 12. In addition, the information processing device 12 and a plurality of terminals 16 are connected to a network N and can communicate via the network N.

The tape library 14 comprises a plurality of slots (not shown) and a plurality of tape drives 18, and a magnetic tape T is stored in each slot. The magnetic tape T is an example of a portable recording medium in which data is written or read by sequential access. As an example of the magnetic tape T, a linear tape-open (LTO) tape can be included.

In a case where the information processing device 12 writes or reads data on the magnetic tape T, the magnetic tape T to be written or read is loaded from the slot into the predetermined tape drive 18. In a case where the information processing device 12 completes the writing or reading of the magnetic tape T loaded into the tape drive 18, the magnetic tape T is unloaded from the tape drive 18 to the originally stored slot.

In the present embodiment, as a format of data to be recorded on the magnetic tape T, an example of an aspect in which an object including data to be stored by a user such as document data and image data and metadata related to the data is applied will be described. A storage system that handles this object is called an object storage system.

Figure 2:
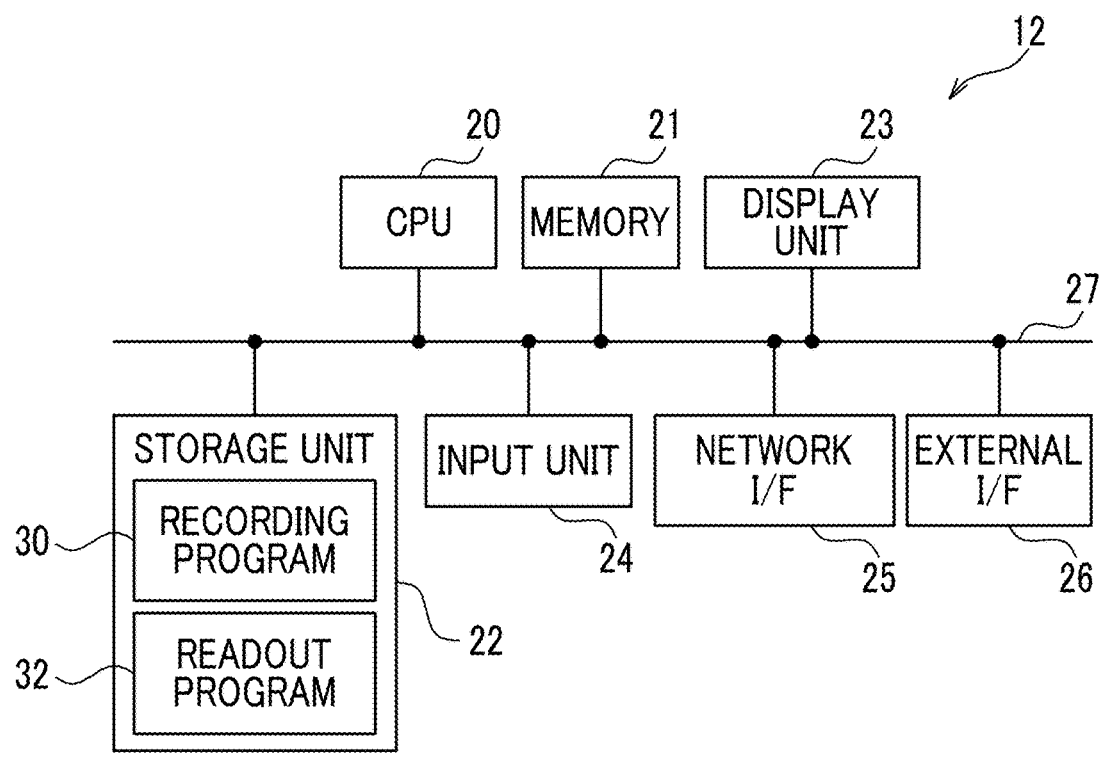
FIG. 2 is a block diagram showing an example of a hardware configuration of an information processing device according to each embodiment.

Next, a hardware configuration of the information processing device 12 according to the present embodiment will be described with reference to FIG. 2. As shown in FIG. 2, the information processing device 12 includes a central processing unit (CPU) 20, a memory 21 as a temporary storage region, and a nonvolatile storage unit 22. In addition, the information processing device 12 includes a display unit 23 such as a liquid crystal display, an input unit 24 such as a keyboard and a mouse, a network interface (I/F) 25 connected to the network N, and an external I/F 26 connected to the tape library 14. The CPU 20, the memory 21, the storage unit 22, the display unit 23, the input unit 24, the network I/F 25, and the external I/F 26 are connected to a bus 27.

The storage unit 22 is realized by a hard disk drive (HDD), a solid state drive (SSD), a flash memory, and the like. A recording program 30 and a readout program 32 are stored in the storage unit 22 as a storage medium. The CPU 20 reads the recording program 30 from the storage unit 22, expands it in the memory 21, and executes the expanded recording program 30. In addition, the CPU 20 reads the readout program 32 from the storage unit 22, expands it in the memory 21, and executes the expanded readout program 32. As an example of the information processing device 12, a server computer or the like can be included. Further, the information processing device 12 is an example of a recording device that records an object on the magnetic tape T. Furthermore, the information processing device 12 is also an example of a readout device that reads the object recorded on the magnetic tape T.

Figure 3:
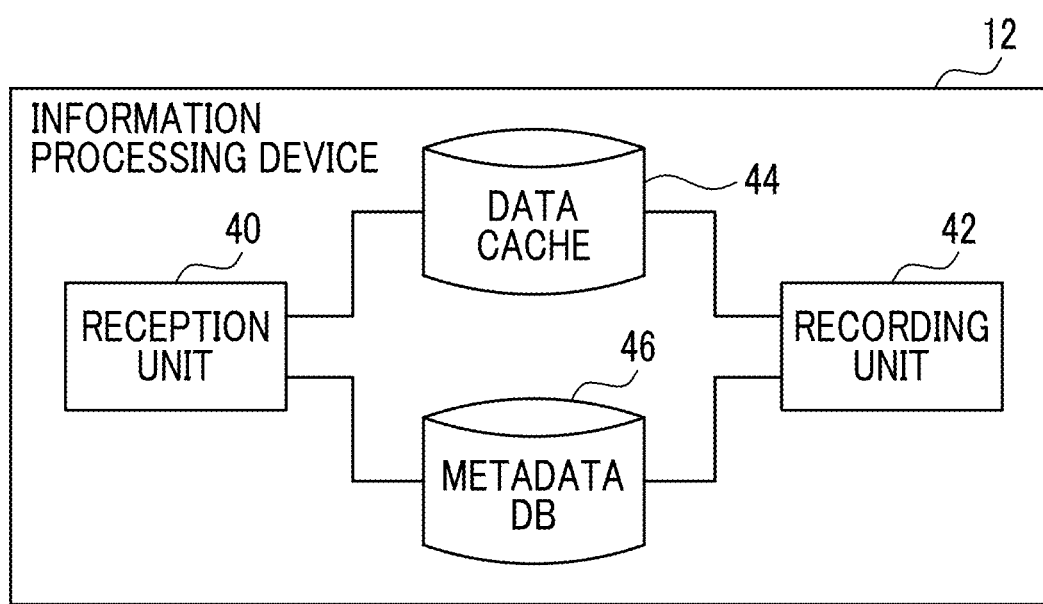
FIG. 3 is a block diagram showing an example of a functional configuration in a case of recording an object of an information processing device according to each embodiment.

Next, a functional configuration in a case where an object is recorded on the magnetic tape T of the information processing device 12 according to the present embodiment will be described with reference to FIG. 3. As shown in FIG. 3, the information processing device 12 includes a reception unit 40 and a recording unit 42. The CPU 20 executes the recording program 30 to function as the reception unit 40 and the recording unit 42. In addition, a data cache 44 and a metadata database (DB) 46 are stored in a predetermined storage region of the storage unit 22. The data cache 44 and the metadata DB 46 are prepared for each magnetic tape T.

The reception unit 40 receives, via the network I/F 25, data transmitted from the terminal 16 and metadata related to the data by using an application programming interface (API) for handling an object. Then, the reception unit 40 stores the received data in the data cache 44 and stores the metadata in the metadata DB 46. The metadata transmitted from the terminal 16 includes identification information such as a data name of corresponding data, a size of data, and attribute information indicating a data attribute such as a time stamp. In addition, the reception unit 40 adds object-specific identification information including the received data and metadata to the metadata.

Figure 4:
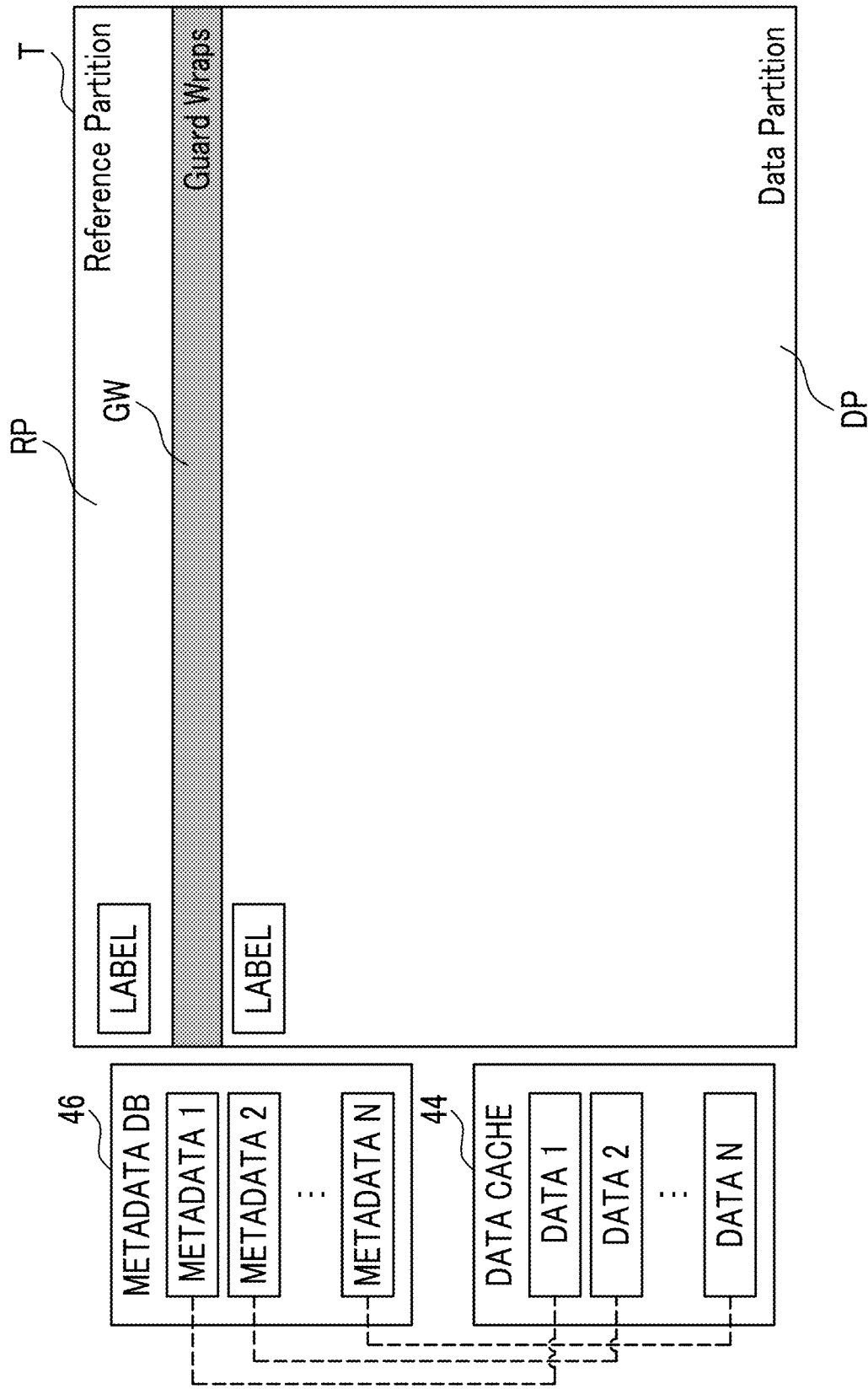
FIG. 4 is a diagram showing an example of an initial state of a magnetic tape according to each embodiment.

FIG. 4 shows an example of a state in which data is stored in the data cache 44 and metadata is stored in the metadata DB 46. Further, in FIG. 4, the magnetic tape T is in a state immediately after being formatted and in which no object has been recorded yet.

As shown in FIG. 4, data is stored in the data cache 44, and metadata is stored in association with the data in the metadata DB 46. In addition, the magnetic tape T according to the present embodiment is divided into two partitions, a reference partition RP and a data partition DP in which an object is recorded, in a case where it is formatted. The reference partition RP and the data partition DP are divided by a guard wraps GW including a plurality of wraps. Further, a label is recorded at the beginning of each of the reference partition RP and the data partition DP. The label includes identification information of the magnetic tape T, format information regarding a writing format of data on the magnetic tape T, and the like.

Figure 5:
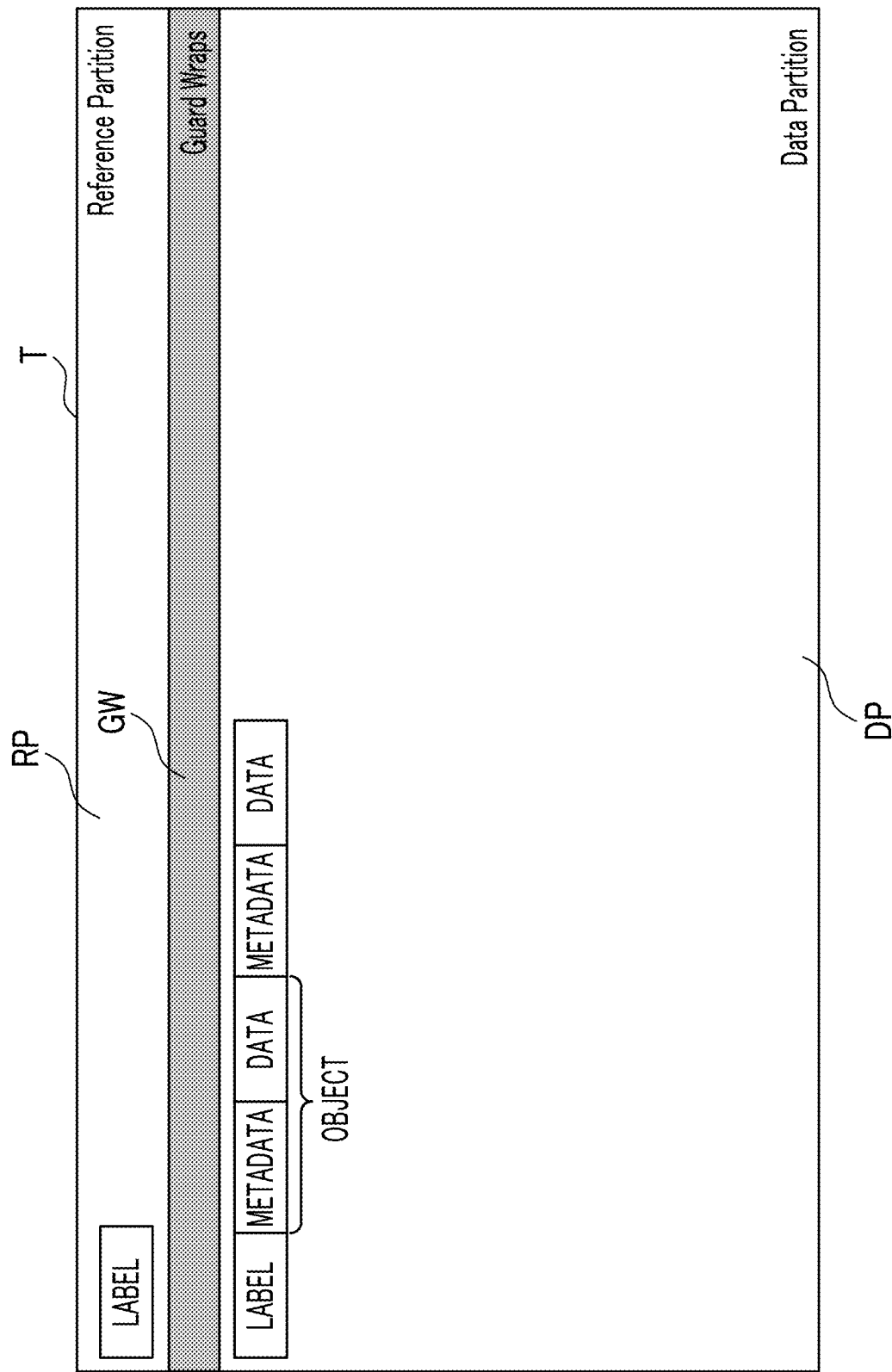
FIG. 5 is a diagram showing an example of a recording state of a magnetic tape according to each embodiment.

The recording unit 42 controls the tape library 14 and loads the magnetic tape T, on which an object is to be recorded, into a predetermined tape drive 18. In addition, the recording unit 42 records an object including the data stored in the data cache 44 and the corresponding metadata stored in the metadata DB 46 in the data partition DP of the loaded magnetic tape T. At this time, the recording unit 42 adds, to the metadata, management information for managing objects such as identification information of the magnetic tape T on which the corresponding object is recorded and information indicating a recording position on the magnetic tape T. FIG. 5 shows an example of a state in which two objects are recorded in the data partition DP.

Further, the recording unit 42 records a set of the metadata of the recorded objects in the data partition DP at every predetermined timing. Hereinafter, this set of the metadata is referred to as "first set data". In the present embodiment, the recording unit 42 records the first set data, which is the set of the metadata of the recorded objects, in the data partition DP every time the total size of the recorded objects exceeds a predetermined size. At this time, in a case where there is already recorded first set data in the data partition DP, the recording unit 42 records first set data that is a set of the metadata of the object recorded after the immediately preceding first set data in the data partition DP. That is, after recording at least one object, the recording unit 42 executes a process of recording first set data which is a set of metadata included in the object at every predetermined timing. Then, the recording unit 42 executes the above process such that each piece of the first set data becomes a set of metadata included in all the objects recorded after recording of the immediately preceding recorded first set data. Therefore, each piece of the first set data is the set of the metadata of all the objects recorded between the immediately preceding first set data and itself. The above process corresponds to a commit process for guaranteeing that the object recorded before the first set data is normally written. The predetermined size in this case is set in advance as a value for preventing the commit process from being not performed for a long time, for example. In addition, for example, the predetermined size in this case may be determined or changed experimentally according to a recording capacity of the magnetic tape T, a use environment or a use condition of the magnetic tape T, or the like, such as the size obtained by multiplying the recording capacity of the magnetic tape T by a predetermined ratio.

Further, for example, the predetermined size in this case may be determined according to an upper limit value of the time (hereinafter referred to as "recording time") required for collectively recording the objects in the data partition DP by one recording instruction. For example, assuming that the upper limit value of the recording time as a required performance of the system is 35 seconds and the recording speed of data to the magnetic tape T is 300 MB/sec, in a case where the total value of the sizes of objects to be recorded is 10 GB or less, the recording time becomes 35 seconds or less. Therefore, in this case, the predetermined size may be 10 GB.

Further, the recording unit 42 records at least one first set data in the data partition DP and then records the set of the first set data recorded in the data partition DP in the data partition DP. Hereinafter, this set of the first set data is referred to as "second set data". At this time, in a case where there is the second set data in the data partition DP, the recording unit 42 records second set data that is the set of the first set data recorded after the set of the immediately preceding first set data in the data partition DP. Therefore, each piece of the second set data is a set of all the first set data recorded between the immediately preceding second set data and itself.

In the present embodiment, a case where the metadata of all the recorded objects are recorded as set data has been described as an example, but the present invention is not limited to this case, and the metadata of all the recorded objects need not necessarily be recorded for the purpose of preventing a decrease of recording capacity, improving recording efficiency, and reducing unnecessary information.

Figure 6:
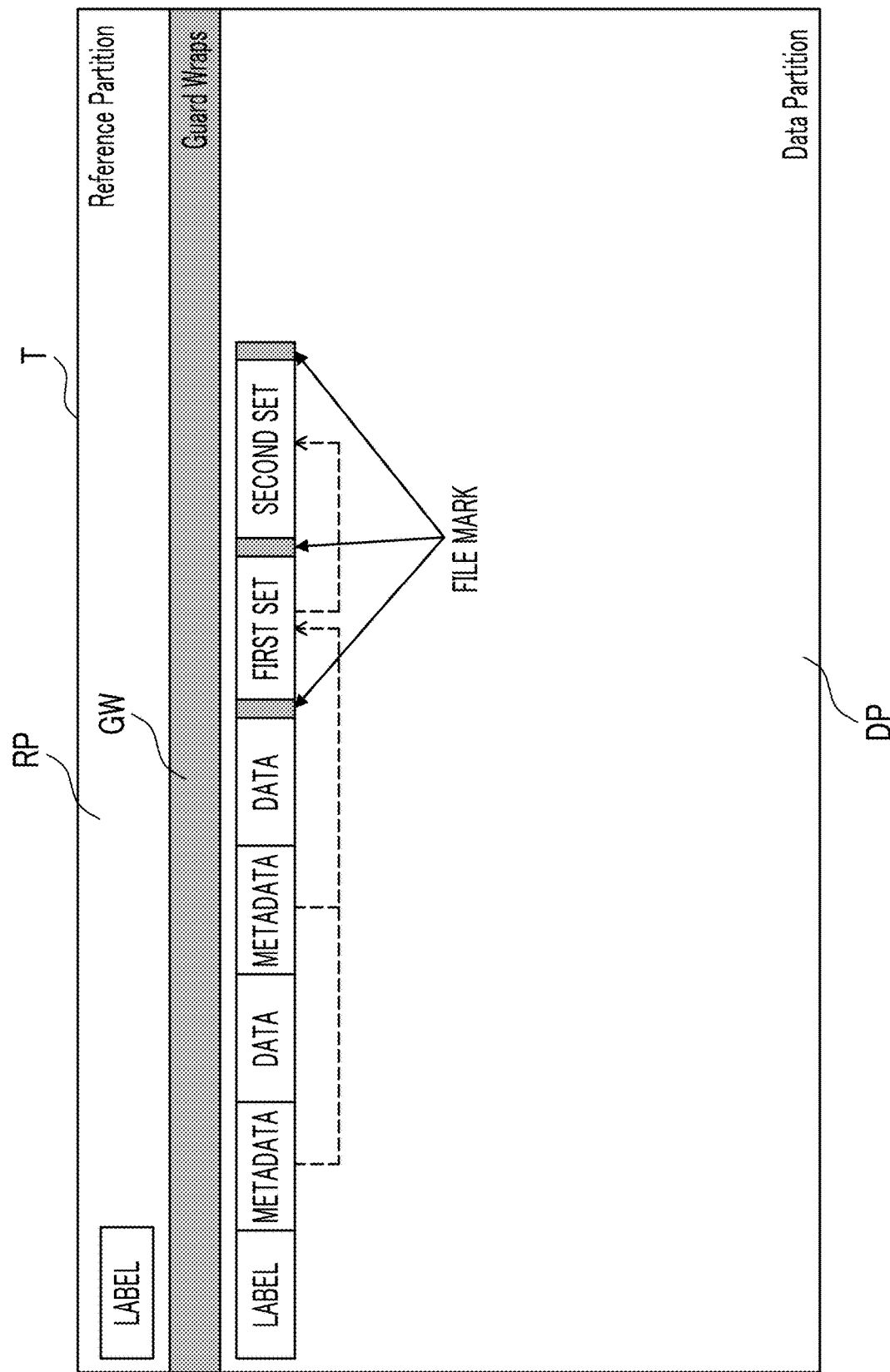
FIG. 6 is a diagram showing an example of a recording state of a magnetic tape according to each embodiment.

In a case where the first set data is not recorded in the data partition DP, as shown in FIG. 6, first set data which is a set of metadata recorded from the beginning of the data partition DP is recorded in the data partition DP. In addition, in a case where the second set data is not recorded in the data partition DP, second set data which is a set of first set data recorded from the beginning of the data partition DP is recorded in the data partition DP. In FIG. 6, the first set data is denoted by "first set" and the second set data is denoted by "second set". This denotation also applies to FIGS. 7 to 9 described later.

As shown in FIG. 6, in a case where the first set data and the second set data are recorded in the data partition DP, the recording unit 42 records file marks before and after the first set data and before and after the second set data. The first set data and the second set data recorded in the data partition DP can be searched by using the file marks.

Figure 7:
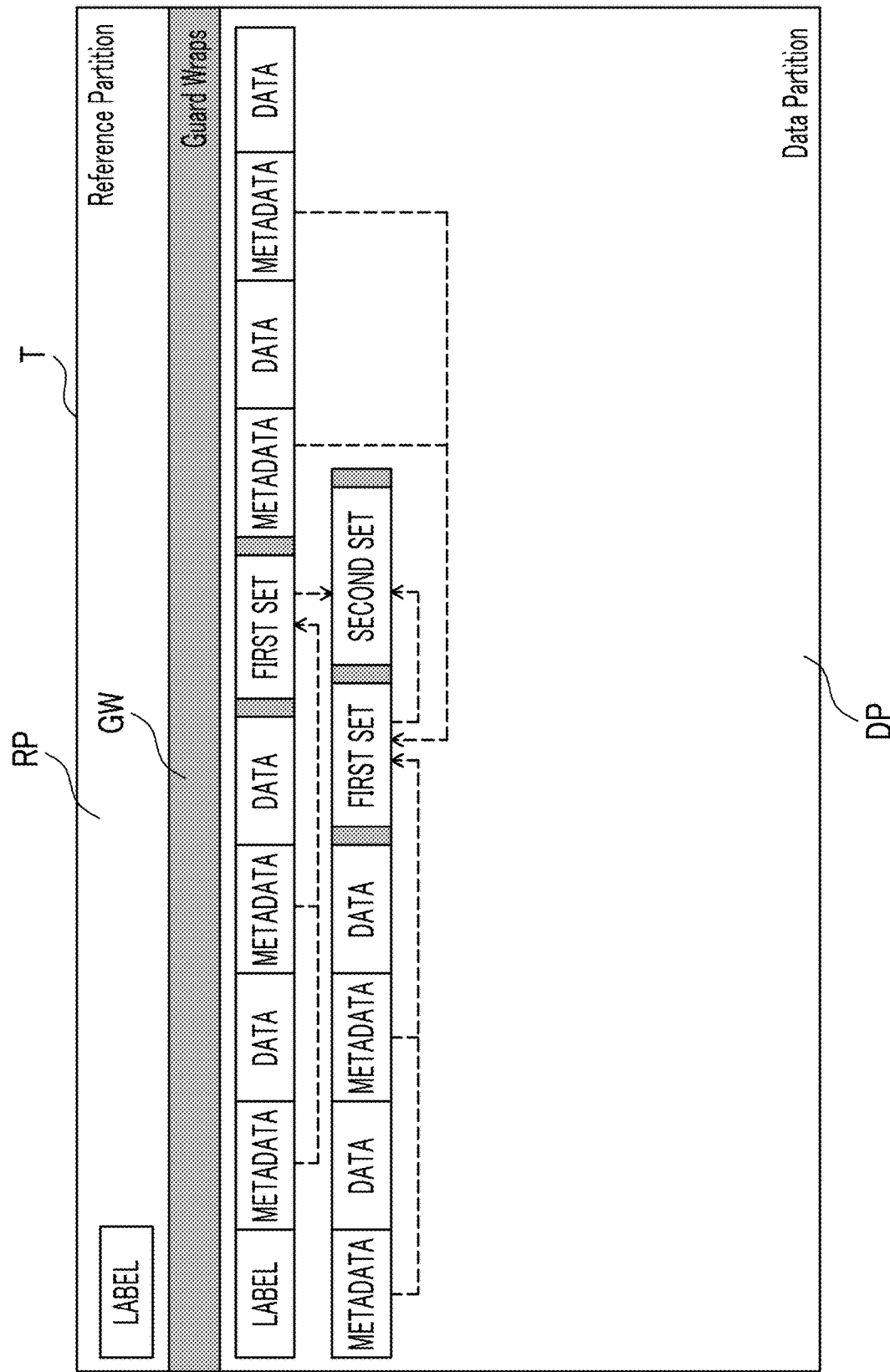
FIG. 7 is a diagram showing an example of a recording state of a magnetic tape according to each embodiment.

In addition, in a case where the first set data is recorded in the data partition DP, as shown in FIG. 7, the first set data which is the set of the metadata of the object recorded after the immediately preceding first set data is recorded in the data partition DP. Further, in a case where the second set data is recorded in the data partition DP, the second set data which is the set of the first set data recorded after the immediately preceding second set data is recorded in the data partition DP. That is, in the present embodiment, since a plurality of first set data recorded in the data partition DP does not include the metadata in duplicate, it is possible to suppress a decrease of an effective capacity of the magnetic tape T. In addition, in the present embodiment, since a plurality of second set data recorded in the data partition DP does not include the first set data in duplicate, it is possible to suppress a decrease of an effective capacity of the magnetic tape T.

Further, in a case of recording the object in the data partition DP, the recording unit 42 overwrites and records the object on the second set data in a case where the size of the immediately preceding second set data is equal to or less than a predetermined size. FIG. 7 shows an example in which the second set data of FIG. 6 is overwritten. The predetermined size in this case is predetermined according to the recording speed of the magnetic tape T, for example. In addition, for example, the predetermined size in this case may be determined or changed experimentally according to a recording capacity of the magnetic tape T, a use environment or a use condition of the magnetic tape T, or the like, such as the size obtained by multiplying the recording capacity of the magnetic tape T by a predetermined ratio.

Figure 8:
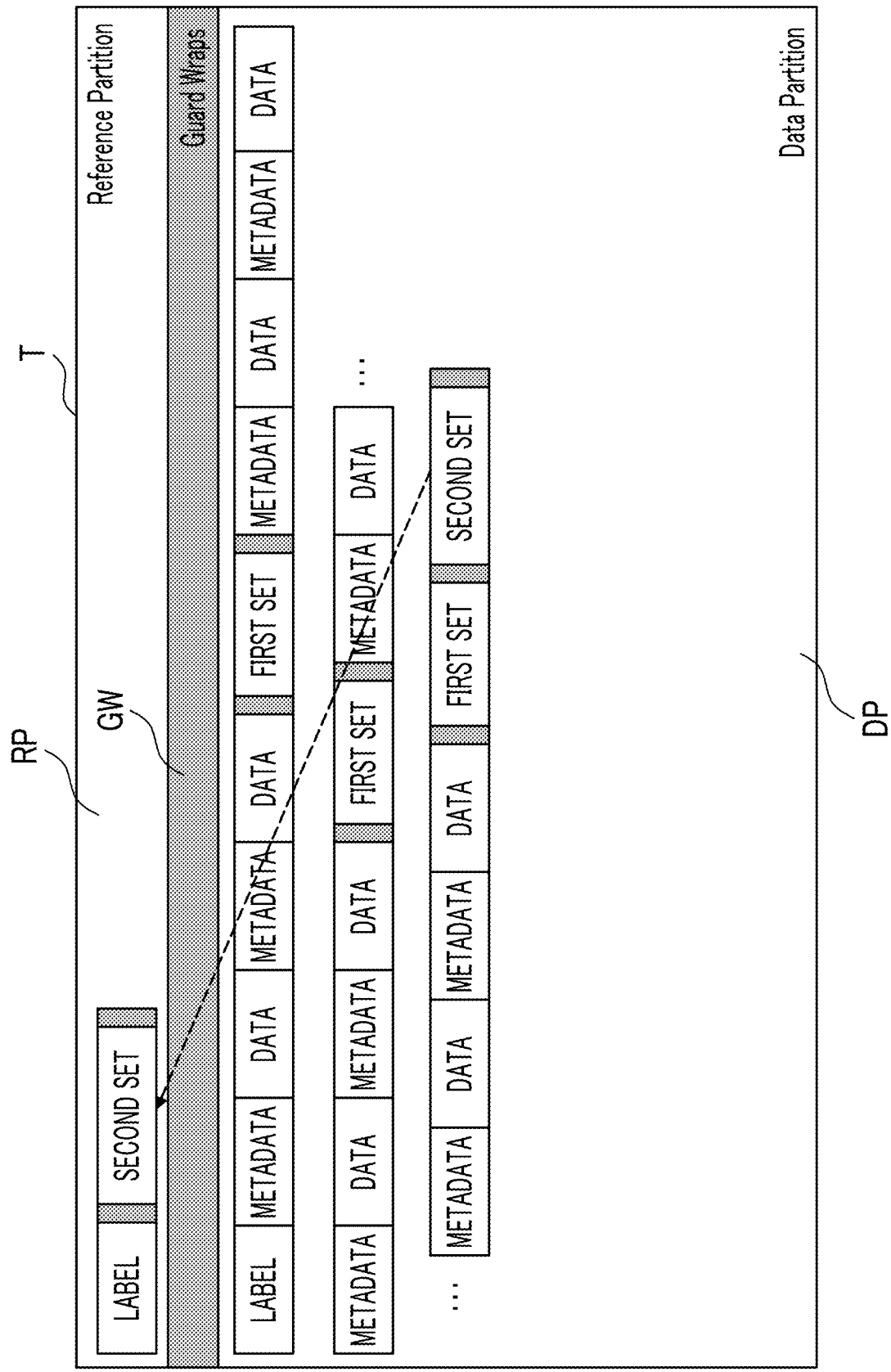
FIG. 8 is a diagram showing an example of a recording state of a magnetic tape according to each embodiment.

As shown in FIG. 8, in a case where the size of the second set data recorded in the data partition DP exceeds a predetermined size, the recording unit 42 records (copies) the second set data in the reference partition RP without deleting the second set data. At this time, the recording unit 42 also records file marks before and after the second set data of the reference partition RP.

Figure 9:
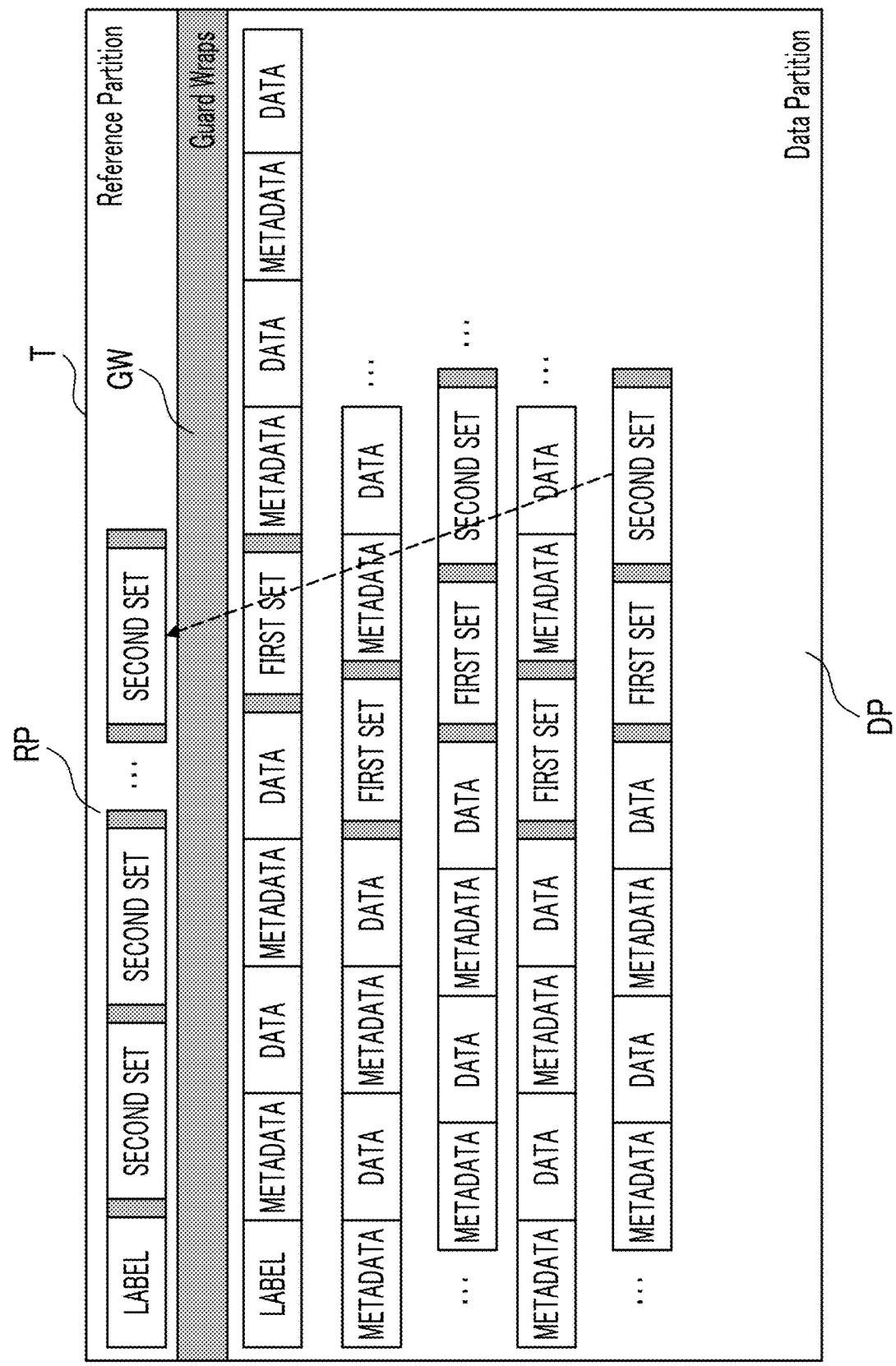
FIG. 9 is a diagram showing an example of a recording state of a magnetic tape according to each embodiment.

In addition, as shown in FIG. 9, in a case where the recording of the data stored in the data cache 44 to the data partition DP is completed and the magnetic tape T is unloaded, the recording unit 42 similarly records the first set data and the second set data to the data partition DP. In this case, the recording unit 42 also records the second set data in the reference partition RP.

Figure 10:
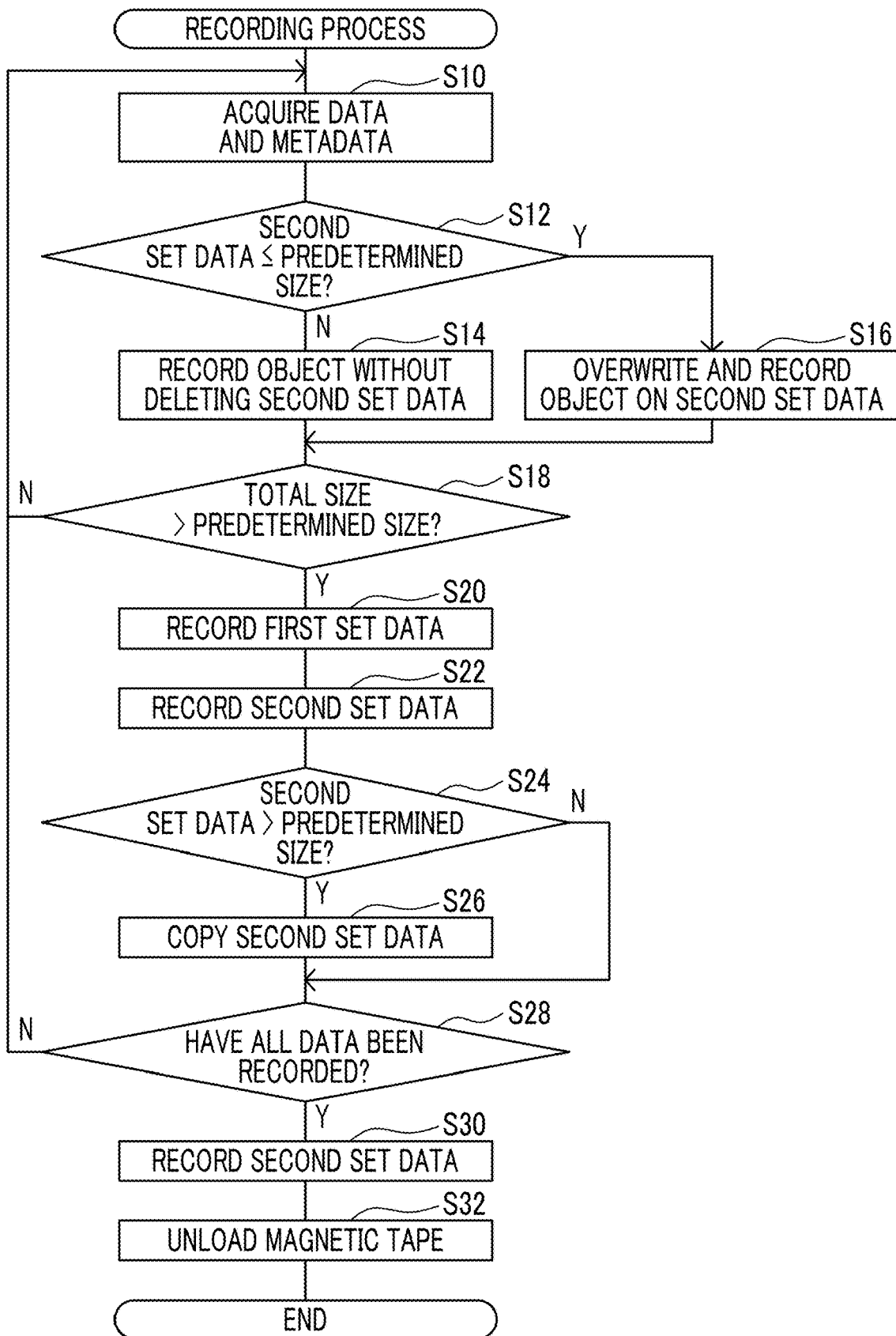
FIG. 10 is a flowchart showing an example of a recording process according to each embodiment.

Next, an operation in a case where an object is recorded on the magnetic tape T of the information processing device 12 according to the present embodiment will be described with reference to FIG. 10. In a case where the CPU 20 executes the recording program 30, the recording process shown in FIG. 10 is executed. The recording process shown in FIG. 10 is executed, for example, after the data and metadata transmitted from the terminal 16 are received by the reception unit 40 and each piece of the data and metadata is stored in the data cache 44 and the metadata DB 46. Here, it is assumed that the magnetic tape T to be recorded is loaded in the tape drive 18.

In step S10 of FIG. 10, the recording unit 42 acquires the data stored in the data cache 44 and the corresponding metadata stored in the metadata DB 46. In a case where step S10 is repeatedly executed, the recording unit 42 acquires data and metadata that have not been acquired so far.

In step S12, the recording unit 42 determines whether or not the second set data is recorded immediately before the recording position of the object on the data partition DP of the magnetic tape T and the size of the second set data is equal to or less than a predetermined size. In a case where the determination is positive, the process proceeds to step S16, and in a case where the determination is negative, the process proceeds to step S14.

In step S14, the recording unit 42 records the object including the data and the metadata acquired by the process of step S10 without deleting the second set data of the data partition DP. On the other hand, in step S16, the recording unit 42 overwrites and records the object including the data and the metadata acquired by the process of step S10 on the second set data having a predetermined size or less.

In step S18, the recording unit 42 determines whether or not the total size of the objects recorded in the data partition DP exceeds a predetermined size by the repeated process from step S10 to step S16. In a case where the determination is negative, the process returns to step S10, and in a case where the determination is positive, the process proceeds to step S20.

In step S20, as described above, the recording unit 42 records the first set data, which is the set of the metadata of the object recorded after the immediately preceding first set data recorded in the previous step S20, in the data partition DP. In step S22, as described above, the recording unit 42 records the second set data, which is the set of the first set data recorded in the data partition DP after the immediately preceding second set data recorded in the previous step S22, in the data partition DP.

In step S24, the recording unit 42 determines whether or not the size of the second set data recorded by the process of step S22 exceeds a predetermined size. In a case where the determination is negative, the process proceeds to step S28, and in a case where the determination is positive, the process proceeds to step S26. In step S26, the recording unit 42 records (copies) the second set data recorded by the process of step S22 in the reference partition RP.

In step S28, the recording unit 42 determines whether or not all the data stored in the data cache 44 have been recorded in the data partition DP. In a case where the determination is negative, the process returns to step S10, and in a case where the determination is positive, the process proceeds to step S30. In step S30, the recording unit 42 records the first set data and the second set data in the data partition DP, and records the second set data in the reference partition RP.

In step S32, the recording unit 42 controls the tape library 14 and unloads the magnetic tape T from the tape drive 18. In a case where the process of step S32 ends, the recording process ends.

Figure 11:
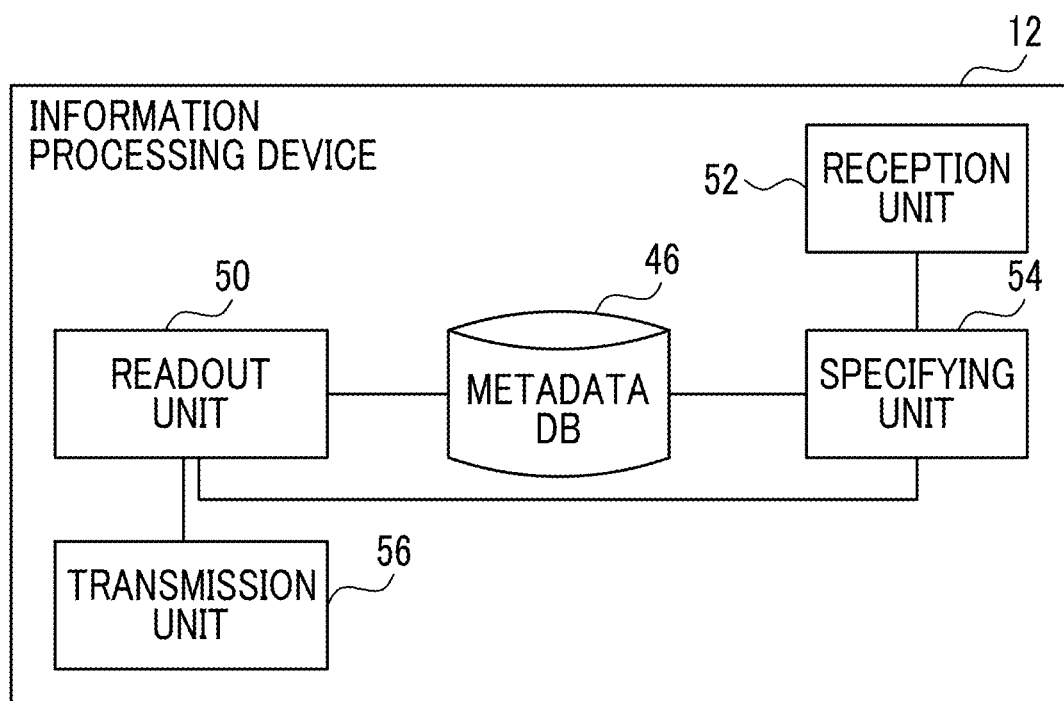
FIG. 11 is a block diagram showing an example of a functional configuration in a case of reading an object of an information processing device according to each embodiment.

Next, a functional configuration of the information processing device 12 in a case where the object is read from the magnetic tape T on which the object is recorded as described above will be described with reference to FIG. 11. As shown in FIG. 11, the information processing device 12 includes a readout unit 50, a reception unit 52, a specifying unit 54, and a transmission unit 56. The CPU 20 executes the readout program 32 to function as the readout unit 50, the reception unit 52, the specifying unit 54, and the transmission unit 56.

At the time of recovery from a failure or the like, the administrator of the information processing device 12 causes the tape drive 18 to load the magnetic tape T. In a case where the magnetic tape T is loaded into the tape drive 18, the readout unit 50 stores the metadata in the metadata DB 46 as described below. That is, in this case, the readout unit 50 refers to the second set data recorded in the reference partition RP of the loaded magnetic tape T, the second set data recorded in the data partition DP, the first set data recorded in the data partition DP, and the metadata recorded in the data partition DP in this order, and stores the metadata in the metadata DB 46.

Specifically, the readout unit 50 reads the second set data recorded in the reference partition RP and stores the metadata included in the read second set data in the metadata DB 46. In addition, in a case where there is not the second set data in the reference partition RP, the readout unit 50 reads the second set data recorded in the data partition DP, and stores the metadata included in the read second set data in the metadata DB 46.

In addition, in a case where there is not the second set data in the reference partition RP and the data partition DP, the readout unit 50 reads the first set data recorded in the data partition DP, and stores the metadata included in the read first set data in the metadata DB 46.

In addition, in a case where there are not the second set data and the first set data in the reference partition RP and the data partition DP, the readout unit 50 reads the metadata recorded in the data partition DP, and stores the read metadata in the metadata DB 46. In a case where reading the metadata recorded on the magnetic tape T, the readout unit 50 may not have to read the metadata already existing in the metadata DB 46 by comparing a hash value or the like.

The readout unit 50 also reads an object recorded at a position on the magnetic tape T specified by the specifying unit 54 described later.

The reception unit 52 receives, via the network I/F 25, an object readout instruction transmitted from the terminal 16 via the network N. This readout instruction includes object-specific identification information.

The specifying unit 54 refers to the metadata DB 46 and uses the metadata including identification information received by the reception unit 52 to identify a position of an object indicated by the identification information on the magnetic tape T.

The transmission unit 56 transmits the object read by the readout unit 50 to the terminal 16 via the network I/F 25.

Figure 12:
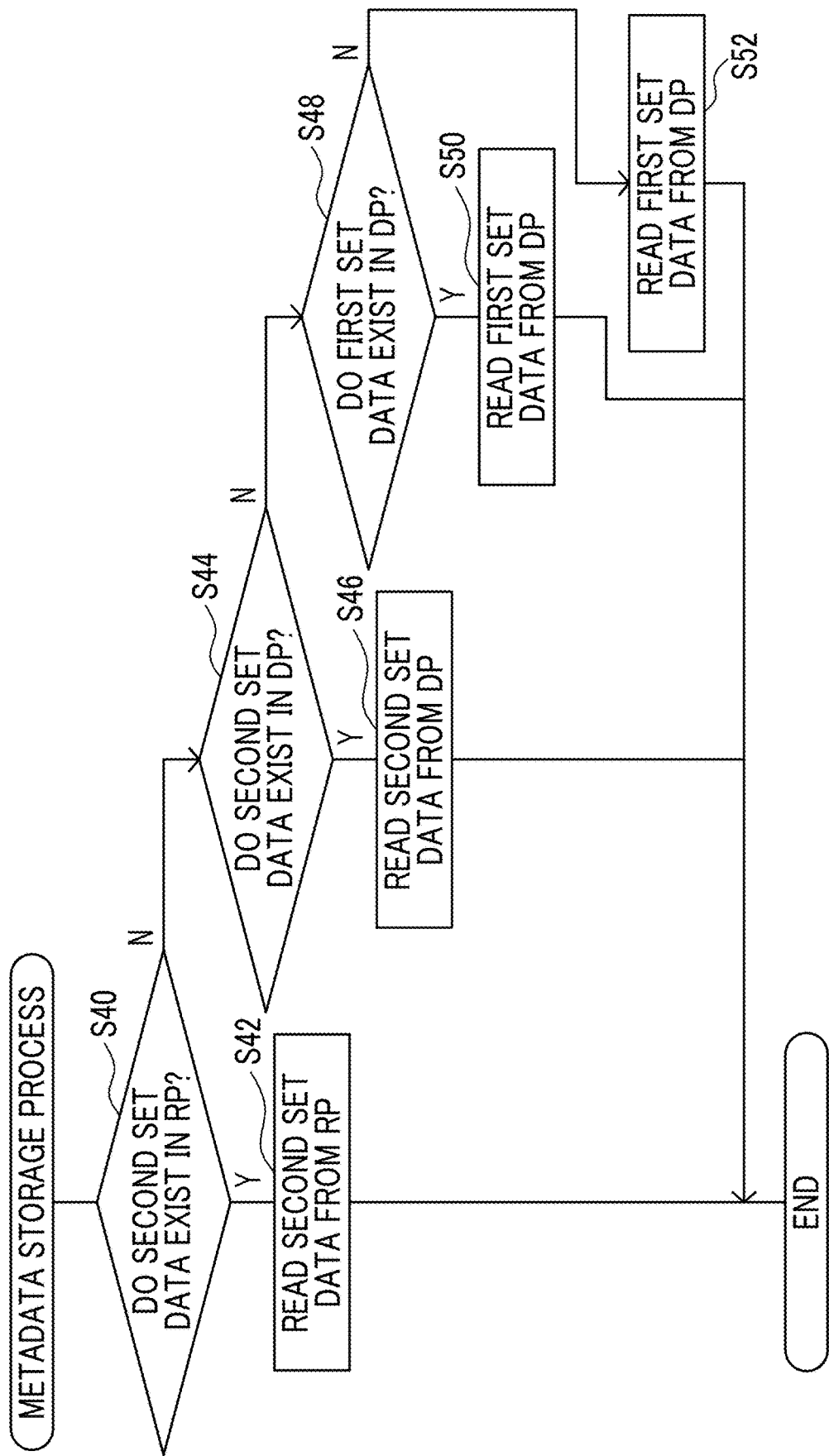
FIG. 12 is a flowchart showing an example of a metadata storage process according to each embodiment.
Figure 13:
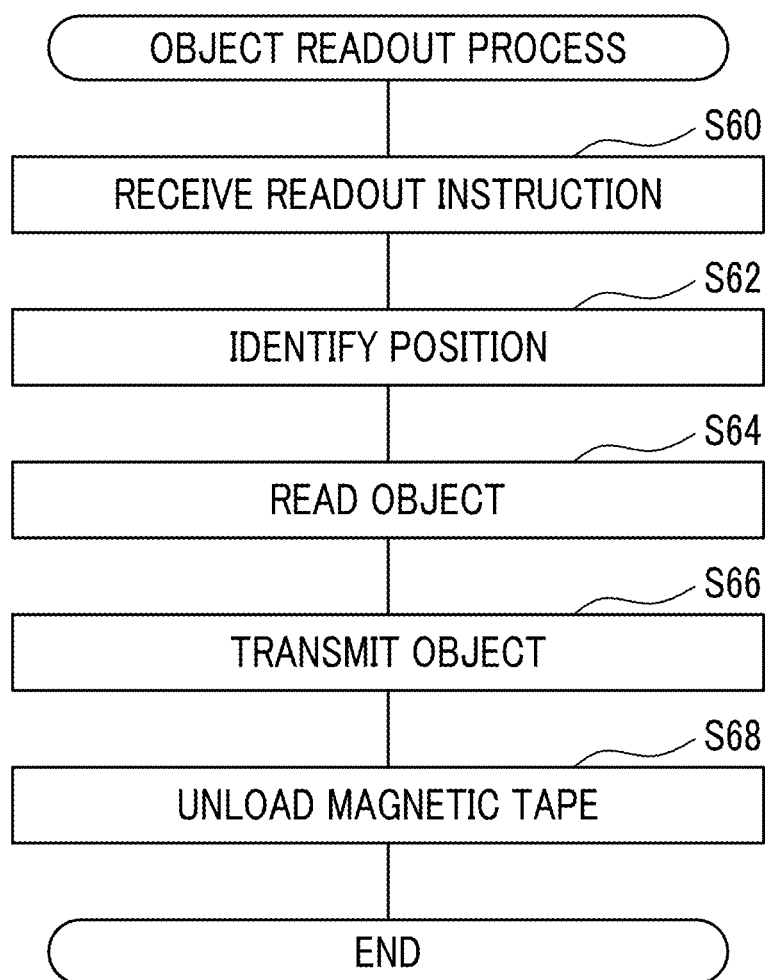
FIG. 13 is a flowchart showing an example of an object readout process according to each embodiment.

Next, an operation in a case where the object is recorded from the magnetic tape T of the information processing device 12 according to the present embodiment will be described with reference to FIGS. 12 and 13. In a case where the CPU 20 executes the readout program 32, a metadata storage process shown in FIG. 12 and an object readout process shown in FIG. 13 are executed. The metadata storage process shown in FIG. 12 is executed, for example, in a case where the magnetic tape T is loaded in the tape drive 18. In addition, the object readout process shown in FIG. 13 is executed, for example, in a case where the information processing device 12 receives the object readout instruction transmitted from the terminal 16 via the network N.

In step S40 in FIG. 12, the readout unit 50 determines whether or not the second set data exists in the reference partition RP of the loaded magnetic tape T. In a case where the determination is negative, the process proceeds to step S44, and in a case where the determination is positive, the process proceeds to step S42. In step S42, the readout unit 50 reads the second set data recorded in the reference partition RP and stores the metadata included in the read second set data in the metadata DB 46.

In step S44, the readout unit 50 determines whether or not the second set data exists in the data partition DP of the loaded magnetic tape T. In a case where the determination is negative, the process proceeds to step S48, and in a case where the determination is positive, the process proceeds to step S46. In step S46, the readout unit 50 reads the second set data recorded in the data partition DP and stores the metadata included in the read second set data in the metadata DB 46.

In step S48, the readout unit 50 determines whether or not the first set data exists in the data partition DP of the loaded magnetic tape T. In a case where the determination is negative, the process proceeds to step S52, and in a case where the determination is positive, the process proceeds to step S50. In step S50, the readout unit 50 reads the first set data recorded in the data partition DP and stores the metadata included in the read first set data in the metadata DB 46.

In step S52, the readout unit 50 reads the metadata recorded in the data partition DP and stores the read metadata in the metadata DB 46. In a case where the process of step S42, step S46, step S50, or step S52 ends, the metadata storage process ends.

In step S60 of FIG. 13, as described above, the reception unit 52 receives, via the network I/F 25, the object readout instruction transmitted from the terminal 16 via the network N. In step S62, the specifying unit 54 refers to the metadata DB 46 and uses the metadata including identification information received by the process of step S60 to identify a position of the object indicated by the identification information on the magnetic tape T.

In step S64, the readout unit 50 reads the object recorded at the position on the magnetic tape T specified by the process of step S62. In step S66, the transmission unit 56 transmits the object read by the process of step S64 to the terminal 16 via the network I/F 25. In step S68, the readout unit 50 controls the tape library 14 and unloads the magnetic tape T from the tape drive 18. In a case where the process of step S68 ends, the object readout process ends.

As described above, according to this embodiment, it is possible to suppress a decrease of an effective capacity of the magnetic tape T. In addition, according to the present embodiment, since the metadata is recorded in the second set data in the reference partition RP and the second set data, the first set data, and the metadata in the data partition DP, a fault resistance can be enhanced. Further, according to the present embodiment, an increase in the size of the first set data and the second set data is suppressed by avoiding a duplication of metadata between the first set data and a duplication of metadata between the second set data in each partition. Accordingly, it is possible to suppress an increase in time spent for recording the first set data and the second set data on the magnetic tape T, and as a result, it is possible to suppress a decrease in an effective recording speed. Further, according to the present embodiment, the second set data is divided so as not to exceed a predetermined size. Therefore, as a result of suppressing the increase in the size of the first set data and the second set data recorded at one time, it is possible to suppress the decrease in the effective recording speed. The effective recording speed here means a recording speed (that is, a recording speed including the recording of metadata) from the start to the end of the recording of the data to be recorded on the magnetic tape T by the user. In addition, the effective recording speed is a speed obtained by dividing the size of data to be recorded by the user by the time from the start of the recording of the data on the magnetic tape T to the end thereof.

Second Embodiment

A second embodiment of the disclosed technology will be described. The configurations of the recording/readout system 10 and the information processing device 12 according to the present embodiment are the same as those in the first embodiment, and thus the description thereof will be omitted. In addition, an operation of the information processing device 12 according to the present embodiment is also the same as that in the first embodiment, and thus the description thereof will be omitted.

Figure 14:
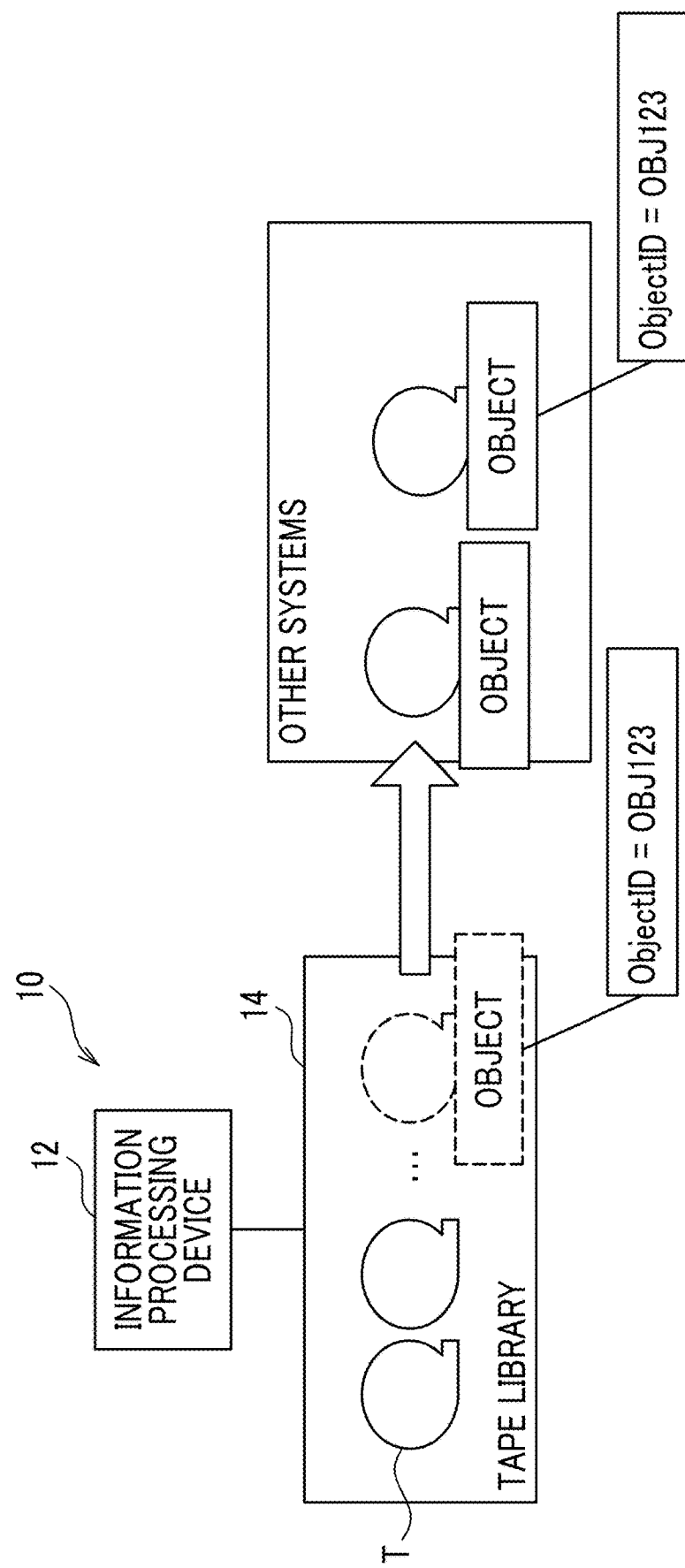
FIG. 14 is a schematic diagram showing an example in a case of using a magnetic tape according to the second embodiment in other systems.

In the present embodiment, as shown in FIG. 14, it is assumed that the magnetic tape T on which an object is recorded is transported by the information processing device 12 and used in other systems. In the first embodiment, the metadata includes object-specific identification information, but in this case, in a case where it is object-specific identification information in the system, it is considered that the same identification information is also used in other systems. In FIG. 14, the object-specific identification information is denoted by "ObjectID".

Figure 15:
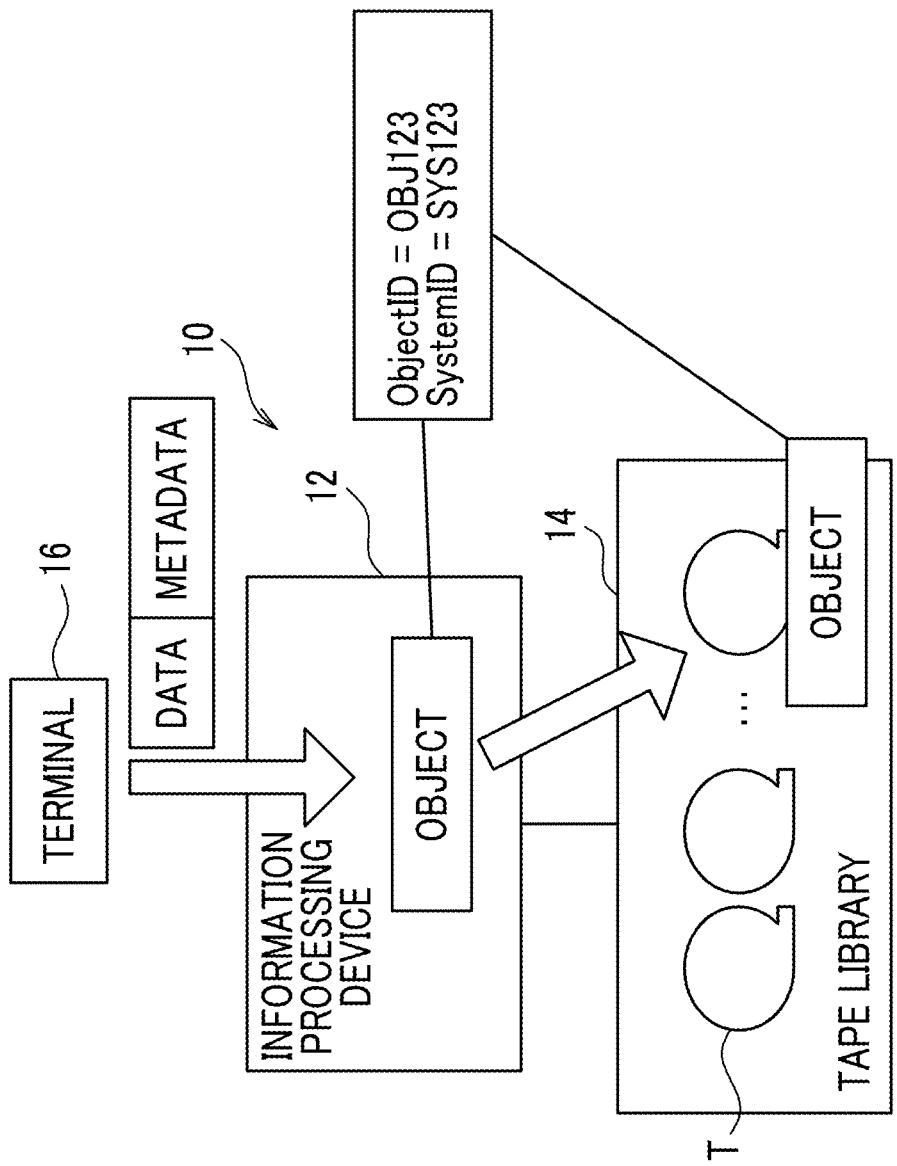
FIG. 15 is a diagram for explaining identification information included in metadata according to the second embodiment.

Therefore, in the present embodiment, as shown in FIG. 15, in a case where generating an object including data and metadata transmitted from the terminal 16, the information processing device 12 includes system-specific identification information in the metadata in addition to the object-specific identification information. In FIG. 15, the object-specific identification information is denoted by "ObjectID", and the system-specific identification information is denoted by "SystemID".

Figure 16:
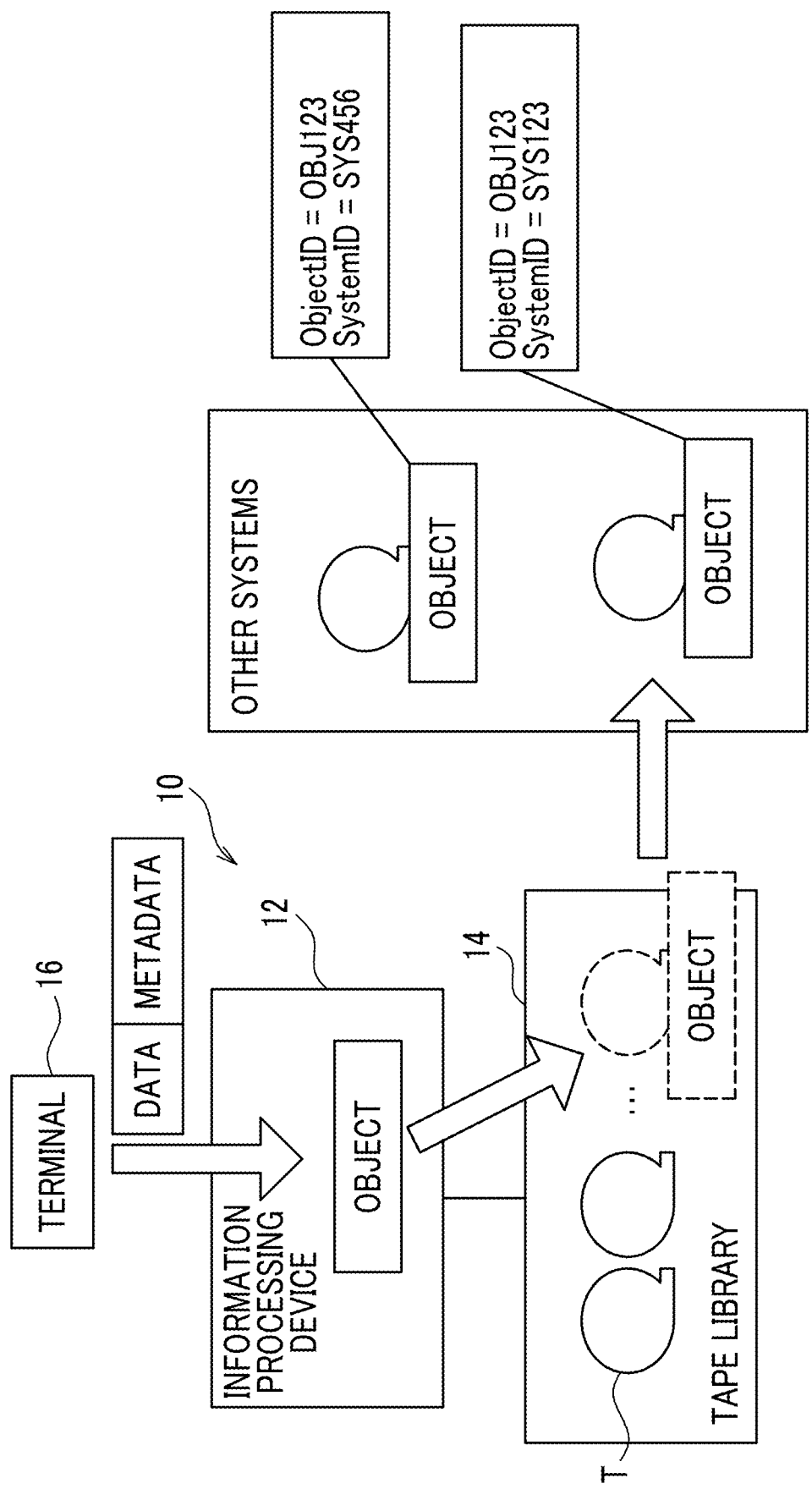
FIG. 16 is a diagram for explaining a case where object-specific identification information according to the second embodiment is duplicated.
Figure 17:
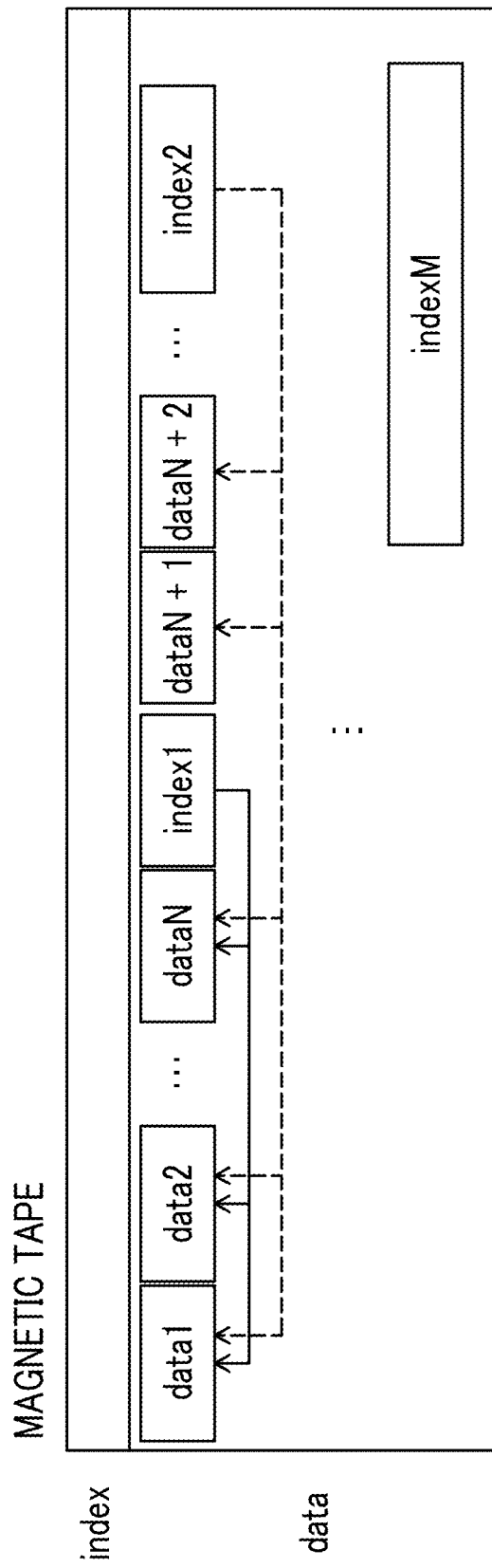
FIG. 17 is a diagram for explaining a recording process of an index in LTFS.

As shown in FIG. 16, in a case where the magnetic tape T on which the object is recorded by the information processing device 12 is used in other systems, the object can be identified as described below by including the system-specific identification information in the metadata. That is, in this case, even in a case where the identification information of the object is duplicated, the object can be identified by using the system-specific identification information in addition to the object-specific identification information.

In each of the above-described embodiments, the case where the first set data, which is a set of metadata of the recorded objects, is recorded in the data partition DP every time the total size of the recorded objects exceeds a predetermined size has been described, but the present invention is not limited to this. For example, the first set data, which is a set of metadata of recorded objects, may be recorded in the data partition DP every time the number of recorded objects exceeds a predetermined number. In addition, for example, the first set data may be recorded in the data partition DP at a timing at which a predetermined time has elapsed since the last recording of the object.

In each of the above-described embodiments, the case where the magnetic tape is applied as a portable recording medium has been described, but the present invention is not limited to this. A portable recording medium other than the magnetic tape may be applied as a portable recording medium.

In addition, various processors other than the CPU may execute various processes executed by the CPU executing software (program) in the above-described embodiment. Examples of the processor in this case include a programmable logic device (PLD) whose a circuit configuration can be changed after the manufacture of a field-programmable gate array (FPGA) or the like, and a dedicated electric circuit which is a processor having a circuit configuration specifically designed for executing a specific process such as an application specific integrated circuit (ASIC) or the like. In addition, the various processes may be executed by one of these various processors, or a combination of two or more processors of the same type or different types (for example, a plurality of FPGAs and a combination of CPU and FPGA). Furthermore, a hardware structure of these various processors is, more specifically, an electric circuit in which circuit elements such as semiconductor elements are combined.

In the above-described embodiment, an aspect in which the recording program 30 and the readout program 32 are stored (installed) in the storage unit 22 in advance has been described, but the present invention is not limited to this. The recording program 30 and the readout program 32 may be provided in a form recorded on a persistent (non-transitory) storage medium such as a compact disk read only memory (CD-ROM), a digital versatile disk read only memory (DVD-ROM), and a universal serial bus (USB) memory. In addition, the recording program 30 and the readout program 32 may be downloaded from an external device via a network.

What is claimed is:

1. A recording device comprising:
   a recording unit that records a plurality of objects on a portable recording medium, each of the plurality of objects including data and metadata related to the data, and executes a process of recording first set data, in addition to the plurality of objects and at every predetermined timing after recording at least one object of the plurality of objects, the first set data being a set of metadata included in the at least one object, and the predetermined timing corresponding to every time a total size of the plurality of objects that are recorded exceeds a predetermined size, wherein, in a case in which there is already recorded first set data, each piece of first set data recorded thereafter is a set of metadata included in at least one object recorded after recording of an immediately preceding recorded piece of first set data.

2. The recording device according to claim 1, wherein the recording unit records second set data, which is a set of at least one recorded first set data, on the portable recording medium, after recording at least one piece of the first set data, and wherein, in a case in which there is already recorded second set data, each piece of the recorded second set data is a set of all first set data recorded between the piece of the second set data and an immediately preceding piece of second set data.

3. The recording device according to claim 2, wherein the recording unit (i) determines whether a size of a piece of the second set data recorded on the portable recording medium is equal to or less than a predetermined size, and (ii) in a case in which the size of the piece of the second set data is equal to or less than a predetermined size, records a next object to be recorded and thereby overwrites the piece of second set data on the portable recording medium.

4. The recording device according to claim 2, wherein the portable recording medium includes a reference partition and a data partition in which the object is recorded, and wherein the recording unit (i) records the first set data and the second set data in the data partition, (ii) determines whether a size of a piece of the second set data recorded on the portable recording medium exceeds a predetermined size, and (iii) in a case where the size of the piece of the second set data recorded in the data partition exceeds the predetermined size, records the piece of the second set data recorded in the data partition in the reference partition.

5. The recording device according to claim 4, wherein in a case where the second set data recorded in the data partition is recorded in the reference partition, the recording unit records the second set data recorded in the data partition in the reference partition without deleting the second set data.

6. The recording device according to claim 1, wherein the metadata includes system-specific identification information and object-specific identification information including the metadata.

7. The recording device according to claim 1, wherein the portable recording medium is a magnetic tape.

8. A recording method executed by a computer, the method comprising:

recording a plurality of objects on a portable recording medium, each of the plurality of objects including data and metadata related to the data; and executing a process of recording first set data, in addition to the plurality of objects and at every predetermined timing after recording at least one object of the plurality of objects, the first set data being a set of metadata included in the at least one object, and the predetermined timing corresponding to every time a total size of recorded objects exceeds a predetermined size, wherein, in a case where there is already recorded first set data, each piece of first set data recorded thereafter is a set of metadata included in at least one object recorded after recording of an immediately preceding recorded piece of first set data.

9. A non-transitory storage medium storing a program for causing a computer to execute a recording processing, the recording processing comprising:

recording a plurality of objects on a portable recording medium, each of the plurality of objects including data and metadata related to the data; and executing a process of recording first set data, in addition to the plurality of objects and at every predetermined timing after recording at least one object of the plurality of objects, the first set data being a set of metadata included in the at least one object, and the predetermined timing corresponding to every time a total size of recorded objects exceeds a predetermined size, wherein, in a case where there is already recorded first set data, each piece of first set data recorded thereafter is a set of metadata included in at least one object recorded after recording of an immediately preceding recorded piece of first set data.

10. A process of recording a plurality of objects on a magnetic tape, each of the plurality of objects including data and metadata related to the data, the process comprising recording first set data, in addition to the plurality of objects, the first set data being a set of metadata included in at least one of the plurality of objects, each piece of first set data being at a position on the tape corresponding to every predetermined timing after at least one of the plurality of objects is recorded, wherein, in a case in which there is already recorded first set data, each piece of first set data recorded thereafter is a set of metadata included in an object recorded immediately after recording of a preceding piece of first set data.

11. The process of recording claim 10, further comprising additionally recording on the magnetic tape second set data, the second set data being a set of at least one recorded first set data on the portable recording medium, wherein, in a case where there is already recorded second set data, each piece of the second set data is a set of all first set data recorded between the piece of the second set data and an immediately preceding piece of second set data.

* * * * *